US010845132B2

(12) United States Patent
Ruiz et al.

(10) Patent No.: US 10,845,132 B2
(45) Date of Patent: Nov. 24, 2020

(54) ADDITIVELY MANUFACTURED FIN SLOTS FOR THERMAL GROWTH

(71) Applicant: Hamilton Sundstrand Corporation, Charlotte, NC (US)

(72) Inventors: Gabriel Ruiz, Granby, CT (US); Thomas James Killen, West Hartford, CT (US); Daniel Bleeker, Ankeny, IA (US); Michael Doe, Southwick, MA (US); Anthony DeLugan, Agawam, MA (US); James Streeter, Torrington, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 158 days.

(21) Appl. No.: 16/180,665

(22) Filed: Nov. 5, 2018

(65) Prior Publication Data

US 2020/0141663 A1 May 7, 2020

(51) Int. Cl.
| F28F 7/02 | (2006.01) |
| F28F 3/02 | (2006.01) |
| F28F 3/04 | (2006.01) |
| B33Y 80/00 | (2015.01) |

(52) U.S. Cl.
CPC ............. *F28F 3/027* (2013.01); *F28F 3/04* (2013.01); *F28F 7/02* (2013.01); *B33Y 80/00* (2014.12)

(58) Field of Classification Search
CPC ...... F28F 7/02; F28F 3/04; F28F 3/027; F28F 3/048; F28D 7/0041; F28D 7/0025; F28D 9/02
See application file for complete search history.

(56) References Cited

U.S. PATENT DOCUMENTS

| 1,662,870 A * | 3/1928 | Stancliffe | F28D 9/0037 |
| | | | 165/166 |
| 4,083,400 A * | 4/1978 | Dziedzic | F28F 21/04 |
| | | | 165/165 |
| 4,488,920 A * | 12/1984 | Danis | B28B 1/002 |
| | | | 156/155 |

(Continued)

FOREIGN PATENT DOCUMENTS

| EP | 3054254 A1 | 8/2016 |
| FR | 3058510 A1 | 5/2018 |
| JP | H1025386 A | 9/1998 |

OTHER PUBLICATIONS

Extended European Search Report for EP Application No. 19207252.8, dated Apr. 2, 2020, 8 pages.

*Primary Examiner* — Devon Russell
(74) *Attorney, Agent, or Firm* — Kinney & Lange, P.A.

(57) ABSTRACT

A core arrangement for a heat exchanger includes a first core layer. The first core layer includes first upstream and downstream ends, first and second parting sheets parallel to one another, and a plurality of adjacent fins disposed between the first and second parting sheets. Each of the plurality of fins extends from a surface of the first parting sheet to a surface of the second parting sheet, and longitudinally between the first upstream end and the first downstream end. The plurality of fins are further laterally arranged to define a plurality of first fluid passages. Each of a subset of the plurality of fins includes an internal slot positioned away from the first upstream end and the first downstream end.

14 Claims, 3 Drawing Sheets

(56) References Cited

U.S. PATENT DOCUMENTS

| | | | | |
|---|---|---|---|---|
| 4,729,428 A | * | 3/1988 | Yasutake | F28D 9/0062 |
| | | | | 165/153 |
| 4,899,808 A | * | 2/1990 | Gregory | F28F 17/005 |
| | | | | 165/110 |
| 5,040,596 A | * | 8/1991 | Terasaki | F28D 9/0062 |
| | | | | 165/166 |
| 8,590,606 B2 | * | 11/2013 | Arai | F24F 12/006 |
| | | | | 165/166 |
| 10,175,007 B2 | * | 1/2019 | Wang | F28D 9/0037 |
| 2009/0071638 A1 | * | 3/2009 | Murayama | F28F 3/025 |
| | | | | 165/166 |
| 2012/0031597 A1 | * | 2/2012 | Van Dijck | F28D 9/0068 |
| | | | | 165/170 |
| 2013/0075069 A1 | * | 3/2013 | Michael | F28F 9/02 |
| | | | | 165/173 |
| 2013/0167584 A1 | * | 7/2013 | Sunder | B21D 53/04 |
| | | | | 62/643 |
| 2016/0025425 A1 | | 1/2016 | Army, Jr. et al. | |
| 2016/0195342 A1 | | 7/2016 | Army, Jr. et al. | |
| 2017/0234150 A1 | | 8/2017 | Bunker | |
| 2017/0276440 A1 | | 9/2017 | Kenworthy et al. | |
| 2017/0328639 A1 | * | 11/2017 | Clarkson | F28D 5/00 |
| 2018/0299210 A1 | * | 10/2018 | Ronacher | F28F 3/027 |
| 2019/0170455 A1 | * | 6/2019 | McCaffrey | F28F 9/0263 |
| 2019/0285360 A1 | * | 9/2019 | DeLugan | F28D 9/0062 |
| 2020/0141656 A1 | * | 5/2020 | Lewandowski | B33Y 80/00 |

\* cited by examiner

ADDITIVELY MANUFACTURED FIN SLOTS FOR THERMAL GROWTH

BACKGROUND

Plate-fin heat exchangers can experience component thermal fatigue due to fluid temperature differences. Current heat exchangers can include slotted fins to allow for thermal expansion and/or compression. After brazing of the heat exchanger assembly, slots can be added to the faces of the fins using an electrical discharge machining (EDM) process. EDM, however, limits the number of and placement of slots as it generally requires that slots are uniformly added to a particular layer of fins.

SUMMARY

A core arrangement for a heat exchanger includes a first core layer. The first core layer includes first upstream and downstream ends, first and second parting sheets parallel to one another, and a plurality of adjacent fins disposed between the first and second parting sheets. Each of the plurality of fins extends from a surface of the first parting sheet to a surface of the second parting sheet, and longitudinally between the first upstream end and the first downstream end. The plurality of fins are further laterally arranged to define a plurality of first fluid passages. Each of a subset of the plurality of fins includes an internal slot positioned away from the first upstream end and the first downstream end.

A heat exchanger includes a core arrangement having a first core layer. The first core layer includes first upstream and downstream ends, first and second parting sheets parallel to one another, and a plurality of adjacent fins disposed between the first and second parting sheets. Each of the plurality of fins extends from a surface of the first parting sheet to a surface of the second parting sheet, and longitudinally between the first upstream end and the first downstream end. The plurality of fins are further laterally arranged to define a plurality of first fluid passages. Each of a subset of the plurality of fins includes an internal slot positioned away from the first upstream end and the first downstream end.

A method of forming a heat exchanger core includes forming, using an additive manufacturing process, first and second parallel parting sheets and a plurality of adjacent fins disposed between the first and second parting sheets. Each of a subset of the plurality of fins is additively manufactured to include an internal slot.

DETAILED DESCRIPTION

A heat exchanger having selectively slotted fins is disclosed herein. The heat exchanger includes a core having multiple core layers. Two plates, or parting sheets, and a plurality of longitudinally extending fins therebetween define fluid flow passages. One or more of the core layers can include slotted fins which can accommodate thermal expansion or contraction to reduce thermal stresses on the core components. Because the heat exchanger is additively manufactured, the fins can be selectively slotted in a single core layer, as well as among the plurality of layers. This allows for a tailored approach based on the type of heat exchanger and operating environment.

Figure 1:
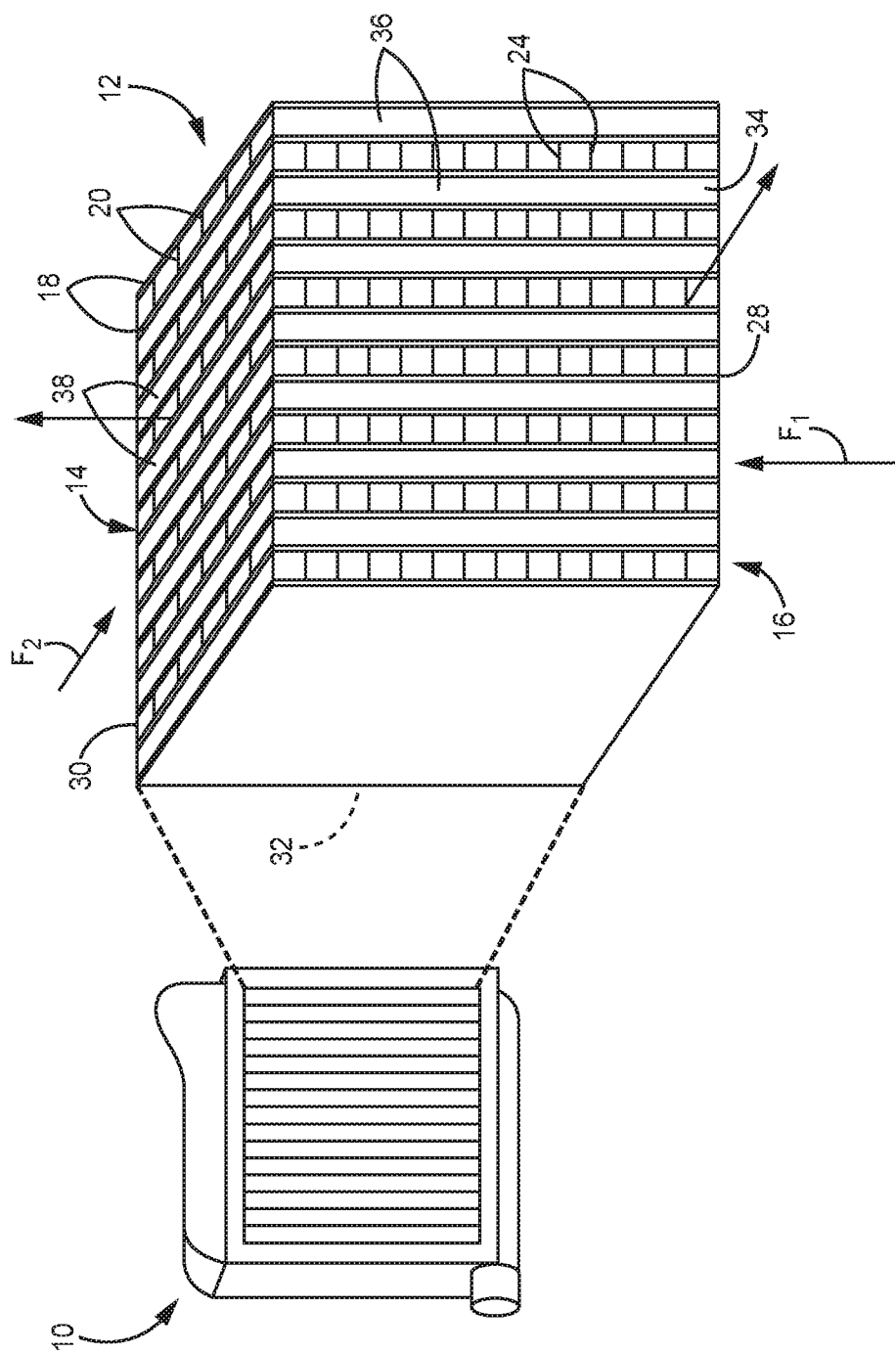
FIG. 1 is a schematic illustration of a heat exchanger with a plate-fin core.

FIG. 1 is a schematic illustration of a heat exchanger 10 with an enlarged view of core 12. As shown, core 12 is plate-fin core having a plurality of alternating first and second core layers 14 and 16, respectively, separated by parting sheets 18. First core layers 14 include a plurality of first fluid fins 20 disposed between adjacent parting sheets 18 which define first fluid passages 22 (labeled in FIG. 2). Similarly, second core layers 16 include a plurality of second fluid fins 24 between adjacent parting sheets 18 which define second fluid passages 26 (labeled in FIG. 2). In operation of heat exchanger 10, a first fluid $F_1$ can be provided to a first fluid inlet side 28 of core 12, flow through passages 22, and exit at first fluid outlet side 30. A second fluid $F_2$ can be provided to a second fluid inlet side 32 of core 12, flow through passages 26, and exit at second fluid outlet side 34. First fluid $F_1$ can be a relatively hot fluid, having a higher temperature than fluid $F_2$, which can be a relatively cool fluid, but the designations can be reversed in alternative embodiments. Further, core 12, as shown, has a cross flow arrangement such that the first and second fluid inlet sides 28, 32 are offset by ninety degrees. In an alternative embodiment, core 12 can have a counter flow arrangement in which inlet side 28, 32 are offset by 180 degrees. Other suitable flow arrangements are contemplated herein. Core 12 further includes closure bars 36 on second fluid inlet and outlet sides 32, 34, and closure bars 38 on first fluid inlet and outlet sides 28, 30. Closure bars 36 are configured to close off/seal first fluid passages 22, while closure bars 38 are configured to close off/seal second fluid passages 26.

Figure 2:
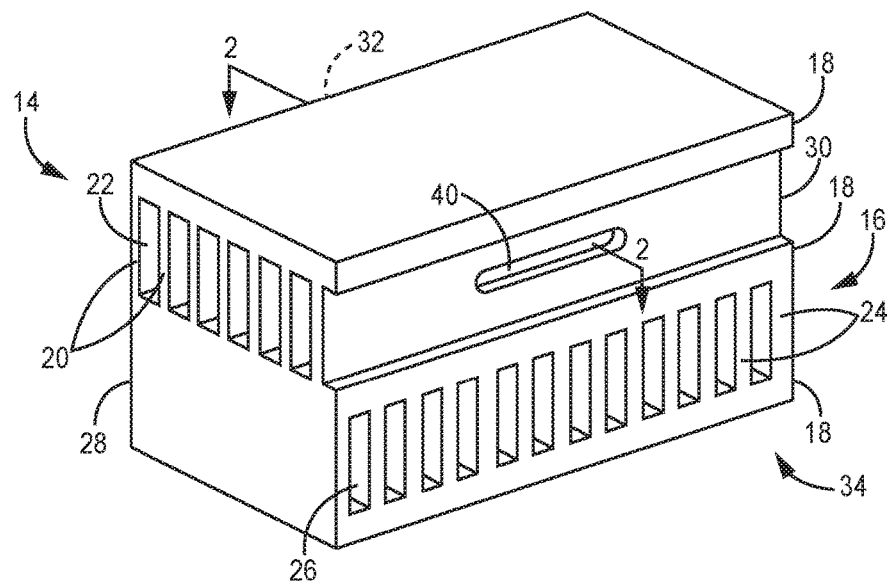
FIG. 2 is an enlarged view of a portion of the core showing internally slotted fins.

FIG. 2 is a partial view of core 12 showing a portion of first core layer 14 and a second core layer 16. First and second fluid fins 20, 24 each extend between their respective adjacent parting sheets 18. As can best be seen in first core layer 14, fins 20, 24 also extend longitudinally, between their respective inlet and outlet sides. In the embodiment shown, first fluid fins 20 can include an internal slot 40 located away from an upstream end (i.e., first fluid inlet side 28) and away from a downstream end (i.e., first fluid outlet side 30) of a fin 20. Although first and second fluid fins 20, 24 are shown generally perpendicular to parting sheets 18, either or both of the fins 20, 24 can be disposed between parting sheets 18 at other (non-right) angles.

Figure 2A:
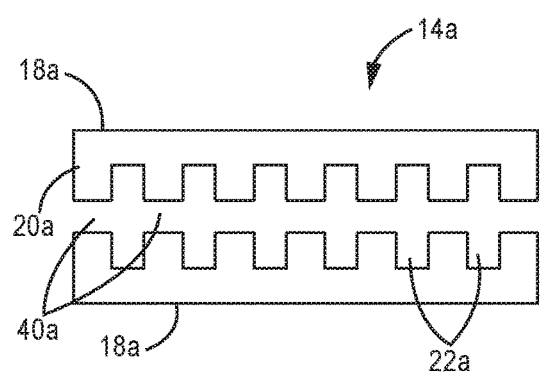
FIGS. 2A and 2B are cross-sectional views of the core of FIG. 2 showing two possible slotting arrangements.
Figure 2B:
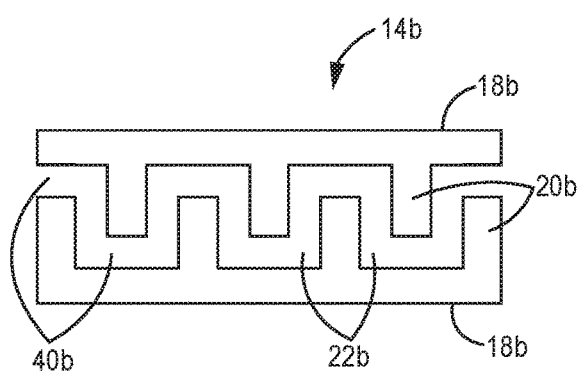

FIGS. 2A and 2B are cross-sectional view of the first core layer 14 of FIG. 2 showing two possible slotting arrangements. As is shown in FIG. 2A, each first fluid fin 20a can be uniformly slotted, such that each fin 20a includes internal slot 40a covering the same cross-sectional position across first core layer 14a. FIG. 2B illustrates a non-uniform arrangement in which some fins 20b are slotted near the upper (based on the orientation of FIG. 2B) parting sheet 18b, while intervening fins are slotted near the lower parting sheet 18b.

Other possible slotting arrangements can include alternating slotted and un-slotted fins, or slots 40 being offset in the upstream or downstream (i.e., longitudinal) direction from the slot of an adjacent fin 20. This includes any of slots 40 being located at the upstream or downstream end of one or more fins 20. Other uniform and non-uniform arrangements are contemplated herein. Further, although second fluid fins 24 of second core layer 16 are shown as un-slotted, fins 24 can include any of the slotting arrangements disclosed above with regard to first core layer 14. As many of the foregoing arrangements include internal and/or nonadjacent slots, creating such slots using conventional (i.e., subtractive) manufacturing methods would be infeasible.

Figure 3:
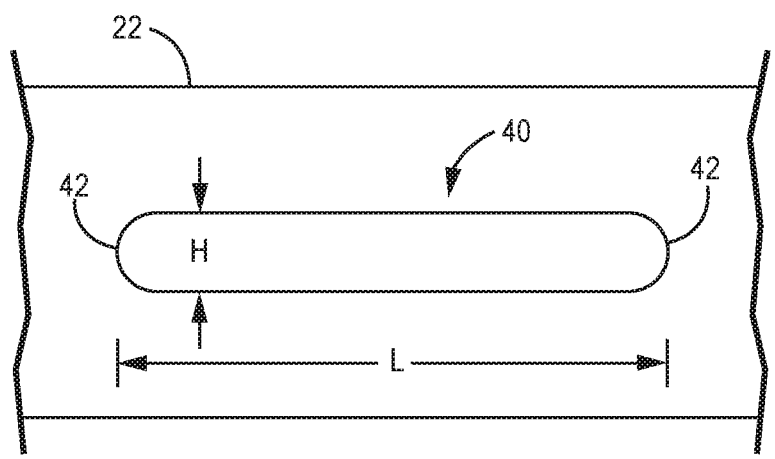
FIGS. 3 and 4 show alternative slot geometries for slotted fins as presented in FIG. 2.
Figure 4:
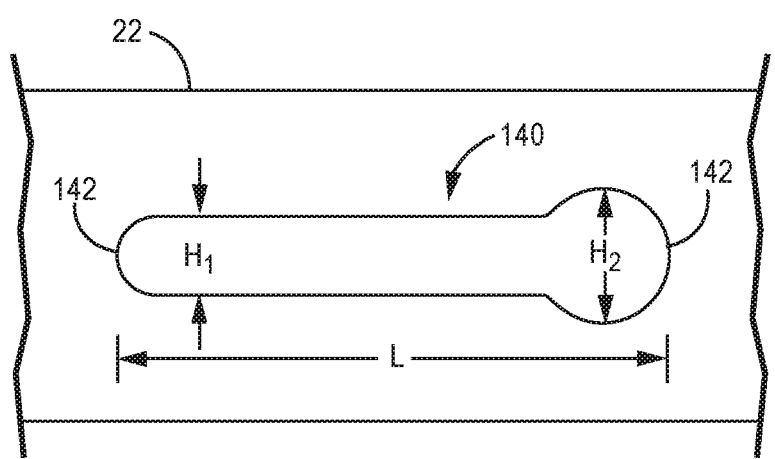

FIG. 3 is an enlarged view of an internal slot 40. As can be seen in FIG. 3, slot 40 can have a length L extending in the longitudinal direction from one curved edge 42 to another, and a height H. Slot 40, as shown, has a uniform height H between edges 42. FIG. 4 is an enlarged view of alternative internal slot 140, which can be implemented in any of the layers of core 12. Slot 140 is similar to slot 40 in that it includes a length L extending longitudinally from one curved edge 142 to another. However, slot 140 is asymmetric in that it has a first height $H_1$ near one edge 142, and a second, greater height $H_2$ near the opposite edge 142. Other asymmetric slot geometries can include an increased height centered between two reduced height portions, or more than two different heights (e.g., a stepped or tapered arrangement). Further, although slots 40, 140 are shown having curved edges 42, 142, other shapes (e.g., squared, pointed, etc.) are contemplated herein.

Slots 40, 140 allow for the thermal expansion (or contraction) of the fins as the various core layers are exposed to rapid thermal changes during thermal cycling of heat exchanger 10. The presence of slots 40, 140 can therefore reduce thermal stressed exerted on core components. The particular size and geometry of a slot, as well as the placement and number of slots in a given core layer can, therefore, be customized to meet the various thermal stress relief requirements of a given heat exchanger.

Slots 40, 140 can be integrally formed with core 12 of heat exchanger 10 using an additive manufacturing process. Exemplary additive manufacturing processes include powder bed fusion techniques such as direct metal laser sintering (DMLS), laser net shape manufacturing (LNSM), electron beam manufacturing (EBM), to name a few, non-limiting examples. Other manufacturing processes allowing for the integral formation of slotted fins are contemplated herein. Forming slotted fins using an additive manufacturing process allows for slots to be placed in regions of the core otherwise inaccessible to subtractive manufacturing tools, and also allows for non-uniformity of individual slots, fins, and core layers of heat exchanger 10. Additive manufacturing allows for the fabrication of a heat exchanger with integrally slotted fins having improved thermal stress resistance, and with fewer production steps, as the need to subtractively manufacture the slots is obviated.

Discussion of Possible Embodiments

The following are non-exclusive descriptions of possible embodiments of the present invention.

A core arrangement for a heat exchanger includes a first core layer. The first core layer includes first upstream and downstream ends, first and second parting sheets parallel to one another, and a plurality of adjacent fins disposed between the first and second parting sheets. Each of the plurality of fins extends from a surface of the first parting sheet to a surface of the second parting sheet, and longitudinally between the first upstream end and the first downstream end. The plurality of fins are further laterally arranged to define a plurality of first fluid passages. Each of a subset of the plurality of fins includes an internal slot positioned away from the first upstream end and the first downstream end.

The core arrangement of the preceding paragraph can optionally include, additionally and/or alternatively, any one or more of the following features, configurations and/or additional components:

The above core arrangement can further include a second core layer adjacent to the first core layer. The second core layer includes second upstream and downstream ends offset from the first upstream and downstream ends, respectively, by at least ninety degrees, a third parting sheet parallel to the second parting sheet, and a plurality of adjacent fins disposed between the second and third parting sheets. Each of the plurality of fins extends from a surface of the second parting sheet to a surface of the third parting sheet, and longitudinally between the second upstream end and the second downstream end. The plurality of fins are further laterally arranged to define a plurality of second fluid passages.

In any of the above core arrangements, a geometry of the internal slot can be characterized by a length corresponding to the longitudinal direction, and a height perpendicular to the length.

In any of the above core arrangements, the geometry of the internal slot can further be characterized by a curved edge.

In any of the above core arrangements, the height can be uniform along the length.

In any of the above core arrangements, the height can be greater at a first position along the length than at a second position along the length.

In any of the above core arrangements, the subset of the plurality of fins can include a first fin and a second fin.

In any of the above core arrangements, the first fin can be adjacent to the second fin.

In any of the above core arrangements, the geometry of the internal slot of the first fin can be different from the geometry of the internal slot of the second fin.

In any of the above core arrangements, the first fin and the second fin can be non-adjacent.

Any of the above core arrangements can further include an un-slotted fin disposed between the first fin and the second fin.

In any of the above core arrangements, a longitudinal position of the internal slot of the first fin can be different from a longitudinal position of the internal slot of the second fin.

A heat exchanger includes a core arrangement having a first core layer. The first core layer includes first upstream and downstream ends, first and second parting sheets parallel to one another, and a plurality of adjacent fins disposed between the first and second parting sheets. Each of the plurality of fins extends from a surface of the first parting sheet to a surface of the second parting sheet, and longitudinally between the first upstream end and the first downstream end. The plurality of fins are further laterally arranged to define a plurality of first fluid passages. Each of a subset of the plurality of fins includes an internal slot positioned away from the first upstream end and the first downstream end.

The heat exchanger of the preceding paragraph can optionally include, additionally and/or alternatively, any one or more of the following features, configurations and/or additional components:

The above heat exchanger can further include a second core layer adjacent to the first core layer. The second core layer includes second upstream and downstream ends offset from the first upstream and downstream ends, respectively, by at least ninety degrees, a third parting sheet parallel to the second parting sheet, and a plurality of adjacent fins disposed between the second and third parting sheets. Each of the plurality of fins extends from a surface of the second parting sheet to a surface of the third parting sheet, and longitudinally between the second upstream end and the second downstream end. The plurality of fins are further laterally arranged to define a plurality of second fluid passages.

In any of the above heat exchangers, a geometry of the internal slot can be characterized by a length corresponding to the longitudinal direction, and a height perpendicular to the length.

In any of the above heat exchangers, the geometry of the internal slot can further be characterized by a curved edge.

In any of the above heat exchangers, the height can be uniform along the length.

In any of the above heat exchangers, the height can be greater at a first position along the length than at a second position along the length.

A method of forming a heat exchanger core includes forming, using an additive manufacturing process, first and second parallel parting sheets and a plurality of adjacent fins disposed between the first and second parting sheets. Each of a subset of the plurality of fins is additively manufactured to include an internal slot.

The method of the preceding paragraph can optionally include, additionally and/or alternatively, any one or more of the following features, configurations and/or additional components:

In the above method, the additive manufacturing process is a powder bed fusion process.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A core arrangement for a heat exchanger comprising:
   a first core layer comprising:
      a first upstream end;
      a first downstream end;
      a first parting sheet;
      a second parting sheet parallel to the first parting sheet; and
      a plurality of adjacent fins disposed between the first and second parting sheets; and
      wherein each of the plurality of fins extends from a surface of the first parting sheet to a surface of the second parting sheet, and longitudinally between the first upstream end and the first downstream end;
      an elongate internal slot in at least one of the plurality of adjacent fins; the elongate internal slot characterized by a length corresponding to the longitudinal direction of the fins of the first core layer, wherein the elongate internal slot is assymetric such that it has a first height at one region and a second, greater height at a second region, each measured perpendicularly to the length;
      wherein the length is greater than each of the first and second height;
      wherein the plurality of fins are further laterally arranged to define a plurality of first fluid passages; and
      wherein the elongate internal slot is positioned away from the first upstream end and the first downstream end.

2. The core arrangement of claim 1, and further comprising:
   a second core layer adjacent to the first core layer, the second core layer comprising:
      a second upstream end either perpendicular to, or parallel to and oppositely disposed from the first upstream end;
      a second downstream end either perpendicular to, or parallel to and oppositely disposed from the first downstream end;
      a third parting sheet parallel to the second parting sheet; and
      a plurality of adjacent fins disposed between the second and third parting sheets;
      wherein each of the plurality of fins extends from a surface of the second parting sheet to a surface of the third parting sheet, and longitudinally between the second upstream end and the second downstream end; and
      wherein the plurality of fins are further laterally arranged to define a plurality of second fluid passages.

3. The core arrangement of claim 2, wherein the geometry of the internal slot is further characterized by a curved edge.

4. The core arrangement of claim 2, wherein the first core layer further comprises a second elongate internal slot in a second of the plurality of adjacent fins.

5. The core arrangement of claim 4, wherein the first fin is adjacent to the second fin.

6. The core arrangement of claim 5, wherein the geometry of the elongate internal slot of the first fin is different from the geometry of the second elongate internal slot of the second fin.

7. The core arrangement of claim 4, wherein the first fin and the second fin are non-adjacent.

8. The core arrangement of claim 6 and further comprising: an un-slotted fin disposed between the first fin and the second fin.

9. The core arrangement of claim 4, wherein a longitudinal position of the internal slot of the first fin is different from a longitudinal position of the internal slot of the second fin.

10. The core arrangement of claim 2, wherein the first core layer and the second core layer are formed using an additive manufacturing process.

11. The core arrangement of claim 10, wherein the additive manufacturing process is a powder bed fusion technique.

12. A heat exchanger comprising:
   a core arrangement comprising:
      a first core layer comprising:
         a first upstream end;
         a first downstream end;
         a first parting sheet;
         a second parting sheet parallel to the first parting sheet; and
         a plurality of adjacent fins disposed between the first and second parting sheets; and
         wherein each of the plurality of fins extends from a surface of the first parting sheet to a surface of the second parting sheet, and longitudinally between the first upstream end and the first downstream end;

an elongate internal slot in at least one of the plurality of adjacent fins; the elongate internal slot characterized by a length corresponding to the longitudinal direction of the fins of the first core layer, wherein the elongate internal slot is assymetric such that it has a first height at one region and a second, greater height at a second region, each measured perpendicularly to the length;

wherein the length is greater than each of the first and second height;

wherein the plurality of fins are further laterally arranged to define a plurality of first fluid passages; and wherein the elongate internal slot positioned away from the first upstream end and the first downstream end.

13. The heat exchanger of claim 12, and further comprising:

a second core layer adjacent to the first core layer, the second core layer comprising:

a second upstream end either perpendicular to, or parallel to and oppositely disposed from the first upstream end;

a second downstream end either perpendicular to, or parallel to and oppositely disposed from the first downstream end by at least ninety degrees;

a third parting sheet parallel to the second parting sheet; and a plurality of adjacent fins disposed between the second and third parting sheets;

wherein each of the plurality of fins extends from a surface of the second parting sheet to a surface of the third parting sheet, and longitudinally between the second upstream end and the second downstream end; and wherein the plurality of fins are further laterally arranged to define a plurality of second fluid passages.

14. The heat exchanger of claim 13, wherein the geometry of the internal slot is further characterized by a curved edge.

* * * * *